(12) United States Patent
Suzukawa et al.

(10) Patent No.: US 10,782,132 B2
(45) Date of Patent: Sep. 22, 2020

(54) DIVISION MAP CREATION SYSTEM AND METHOD FOR CREATING DIVISION MAPS

(71) Applicant: Kubota Corporation, Osaka-shi (JP)

(72) Inventors: Megumi Suzukawa, Amagasaki (JP); Kazuo Sakaguchi, Amagasaki (JP); Atsushi Shinkai, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 329 days.

(21) Appl. No.: 15/841,295

(22) Filed: Dec. 14, 2017

(65) Prior Publication Data

US 2018/0209792 A1 Jul. 26, 2018

(30) Foreign Application Priority Data

Jan. 20, 2017 (JP) ................. 2017-008343

(51) Int. Cl.
| | |
|---|---|
| *G01C 21/00* | (2006.01) |
| *A01B 69/04* | (2006.01) |
| *G05D 1/02* | (2020.01) |
| *G01C 21/20* | (2006.01) |
| *G06Q 50/02* | (2012.01) |
| *G06F 16/29* | (2019.01) |

(52) U.S. Cl.
CPC .......... *G01C 21/005* (2013.01); *A01B 69/008* (2013.01); *G01C 21/20* (2013.01); *G05D 1/0274* (2013.01); *G06F 16/29* (2019.01); *G06Q 50/02* (2013.01); *G05D 2201/0201* (2013.01)

(58) Field of Classification Search
CPC .... G01C 21/005; G01C 21/20; A01B 69/008; G05D 1/0274; G05D 2201/0201; G06F 16/29; G06Q 50/02
See application file for complete search history.

(56) References Cited

U.S. PATENT DOCUMENTS

| | | | | | |
|---|---|---|---|---|---|
| 4,630,773 | A | * | 12/1986 | Ortlip ................. | A01B 79/005 239/1 |
| 5,220,876 | A | * | 6/1993 | Monson ............... | A01B 79/005 111/130 |
| 5,931,882 | A | * | 8/1999 | Fick ..................... | A01B 79/005 111/903 |

FOREIGN PATENT DOCUMENTS

| | | |
|---|---|---|
| JP | 2011-254711 | 12/2011 |
| JP | 2011254711 A * | 12/2011 |

* cited by examiner

*Primary Examiner* — Russell Frejd

(74) *Attorney, Agent, or Firm* — Mori & Ward, LLP

(57) ABSTRACT

A division map creation system includes circuitry and a memory. The circuitry is configured to acquire work field information including a shape of a work field and a position of the work field and to acquire travel routes based on the work field information. Each of work vehicles is configured to travel along each of the travel routes in the work field. The circuitry is configured to divide the work field into a plurality of sections in order to create division maps based on a travel direction in which each of the work vehicles travels along each of the travel routes and based on a work width within which each of the work vehicles works while travelling in the work field. The memory is to store the division maps such that each of the division maps corresponds to each of the work vehicles.

10 Claims, 3 Drawing Sheets

DIVISION MAP CREATION SYSTEM AND METHOD FOR CREATING DIVISION MAPS

CROSS-REFERENCE TO RELATED APPLICATIONS

The present application claims priority under 35 U.S.C. § 119 to Japanese Patent Application No. 2017-008343, filed Jan. 20, 2017. The contents of this application are incorporated herein by reference in their entirety.

BACKGROUND OF THE INVENTION

Field of the Invention

The present invention relates to a division map creation system and a method for creating division maps.

Discussion of the Background

For efficiently performing work and harvesting in a field, for example, there has been used a method for managing the field by dividing the field into a plurality of sections. As a technique of this type, there is, for example, a technique described in Japanese Patent Application Laid-open No. 2011-254711.

In the fertilization map creation system described in Japanese Patent Application Laid-open No. 2011-254711, a fertilization map is created to indicate an amount of fertilization at the time of fertilizing crops planted in a field (corresponding to the "work field" above). In this fertilization map creation system, reflectance of natural light in the field is calculated for each predetermined mesh, and a fertilization map in mesh units is created based on a hot water extractable nitrogen map in mesh units in the field, data on crops and fertilizer, and data on an amount of previously prepared standard fertilizer.

SUMMARY OF THE INVENTION

According to one aspect of the present invention, a division map creation system includes circuitry and a memory. The circuitry is configured to acquire work field information including a shape of a work field and a position of the work field and to acquire travel routes based on the work field information. Each of work vehicles is configured to travel along each of the travel routes in the work field. The circuitry is configured to divide the work field into a plurality of sections in order to create division maps based on a travel direction in which each of the work vehicles travels along each of the travel routes and based on a work width within which each of the work vehicles works while travelling in the work field. The memory is to store the division maps such that each of the division maps corresponds to each of the work vehicles.

According to another aspect of the present invention, a division map creation system includes work field information acquisition means, travel route acquisition means, division map creating means, and division map storing means. The work field information acquisition means are for acquiring work field information including a shape of a work field and a position of the work field. The travel route acquisition means are for acquiring travel routes based on the work field information, each of work vehicles being configured to travel along each of the travel routes in the work field. The division map creating means are for dividing the work field into a plurality of sections in order to create division maps based on a travel direction in which each of the work vehicles travels along each of the travel routes and based on a work width within which each of the work vehicles works while travelling in the work field. The division map storing means are for storing the division maps such that each of the division maps corresponds to each of the work vehicles.

According to further aspect of the present invention, a method for creating division maps includes acquiring work field information including a shape of a work field and a position of the work field. Travel routes are acquired based on the work field information. Each of work vehicles is configured to travel along each of the travel routes in the work field. The work field is divided into a plurality of sections in order to create division maps based on a travel direction in which each of the work vehicles travels along each of the travel routes and based on a work width within which each of the work vehicles works while travelling in the work field. The division maps are stored such that each of the division maps corresponds to each of the work vehicles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
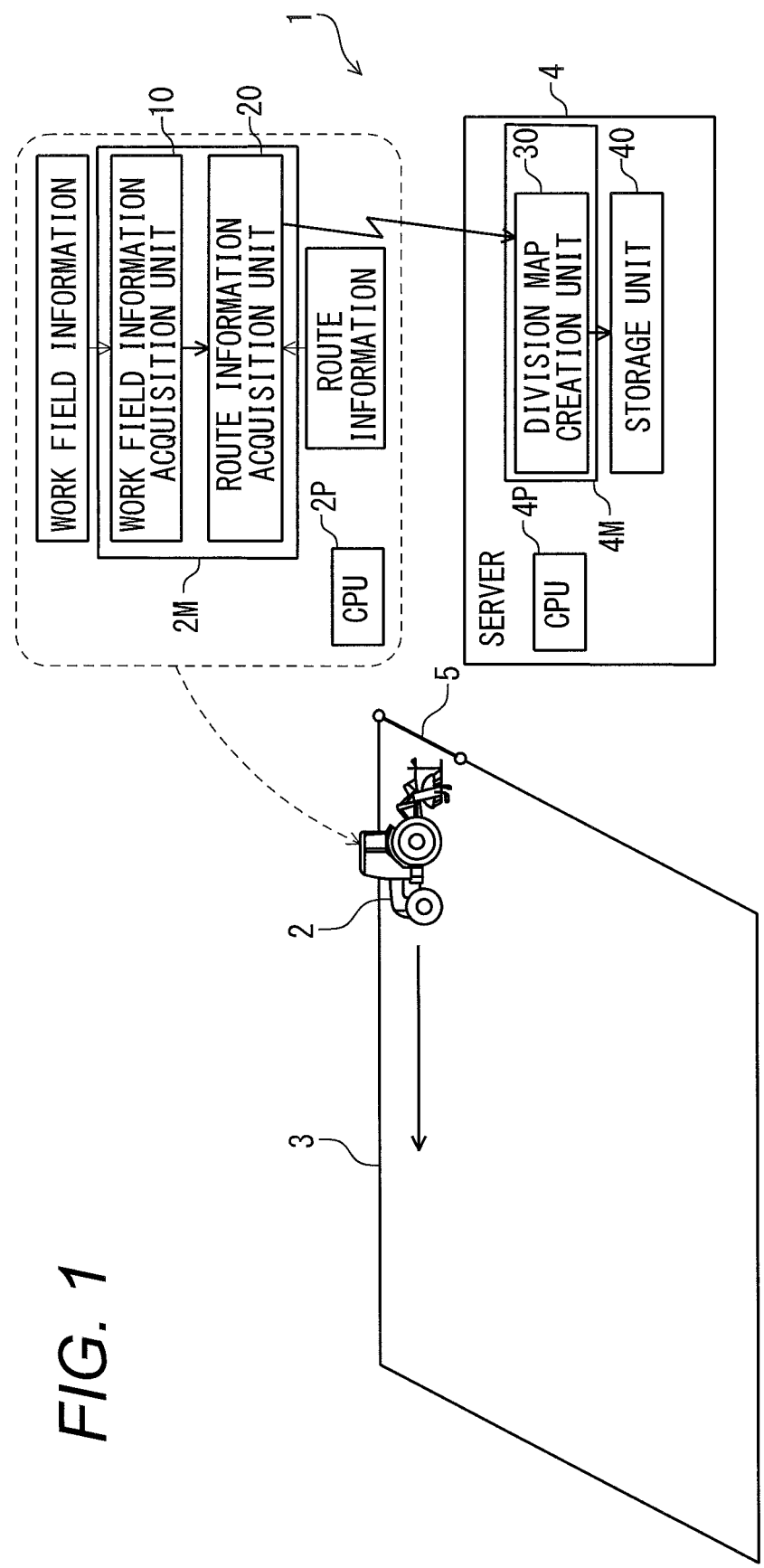
FIG. 1 is a diagram schematically showing a configuration of a division map creation system.

The embodiments will now be described with reference to the accompanying drawings, wherein like reference numerals designate corresponding or identical elements throughout the various drawings.

In the technique described in Japanese Patent Application Laid-open No. 2011-254711, at the time of creating the fertilization map, a border of the mesh is predetermined with a prescribed size (for example, 10 m×10 m) based on a division line for defining, for example, a direction of the ridge and a periphery and a boundary of the field. A work vehicle to be used varies among, for example, the case of planting, the case of fertilizing, and the case of harvesting in the field, and a work width in one-time work also varies depending on the work vehicle. Further, a route along which the work vehicle travels in the field may vary in accordance with the work performed by the work vehicle. For this reason, in the technique described in Japanese Patent Application Laid-open No. 2011-254711, when another work vehicle travels in the field already managed by mesh, it may occur that the travel route and the section are deviated, and the correspondence between data associated with the mesh (e.g., fertilization data and harvesting data) and the work vehicle cannot be obtained to prevent efficient use of the data.

Therefore, in order to make effective use of a map in accordance with work, there is required a division map creation system capable of creating a division map obtained by dividing a work field into a plurality of sections.

A division map creation system according to an embodiment of the present invention has the function of creating a division map obtained by dividing a work field into a plurality of sections. Hereinafter, a division map creation system 1 of the present embodiment will be described.

FIG. 1 is a diagram schematically showing a configuration of the division map creation system 1. As shown in FIG. 1, the division map creation system 1 is configured including functional units that are a work field information acquisition unit 10, a route information acquisition unit 20, a division map creation unit 30, and a storage unit (a memory) 40, and these functional units are constructed with hardware, software, or both, with a CPU (circuitry) taken as a core member so as to perform processing relating to creation of the division map. In the present embodiment, a description will be given with an example where the work field information acquisition unit 10 and the route information acquisition unit 20 are mounted on a work vehicle 2 and the division map creation unit 30 and the storage unit 40 are mounted on a server 4 different from the work vehicle 2. For example, programs of the work field information acquisition unit 10 and the route information acquisition unit 20 are stored in a memory 2M of the work vehicle 2, and the programs are executed by a CPU (circuitry) 2P in the work vehicle 2. A Program of the division map creation unit 30 is stored in a memory 4M of the server 4, which can be the same as or different from the memory 40 and the program are executed by a CPU (circuitry) 4P in the server 4.

The work field information acquisition unit 10 acquires work field information including position information indicating the position of a work field 3 and shape information indicating the shape of the work field 3. The work field 3 is a place where the work vehicle 2 travels while performing work. In the present embodiment, the work vehicle 2 is an agricultural work machine for performing a variety of work in the field, and the work field 3 corresponds to the field. The position information corresponds to position information including latitude and longitude. The shape information is information indicating the shape of the work field 3 when the work field 3 is viewed from above. Hence the work field information acquisition unit 10 acquires the work field information including the position information which is information including the latitude and longitude of the field and the shape information which is information indicating the shape of the field. The work field information acquisition unit 10 may acquire the work field information by communication or may acquire the work field information by inputting data.

The route information acquisition unit 20 acquires route information indicating individual travel routes when the work vehicles 2 travel in the work field 3 based on the work field information. The work field information is transmitted from the work field information acquisition unit 10 described above. In the present embodiment, when the work field information is inputted to the work vehicle 2, the work vehicle 2 sets a travel route so as to efficiently complete the work in the work field 3, and then performs automatic travel based on the travel route. The route information acquisition unit 20 acquires route information indicating this travel route.

Figure 2:
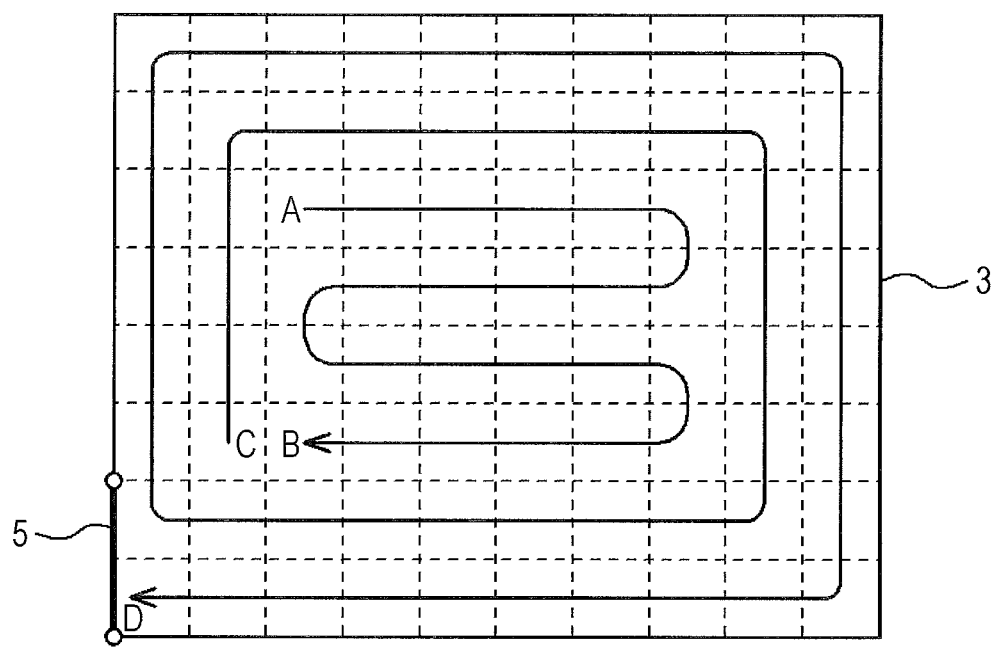
FIG. 2 is a view showing a travel route and a division map of a tractor.
Figure 3:
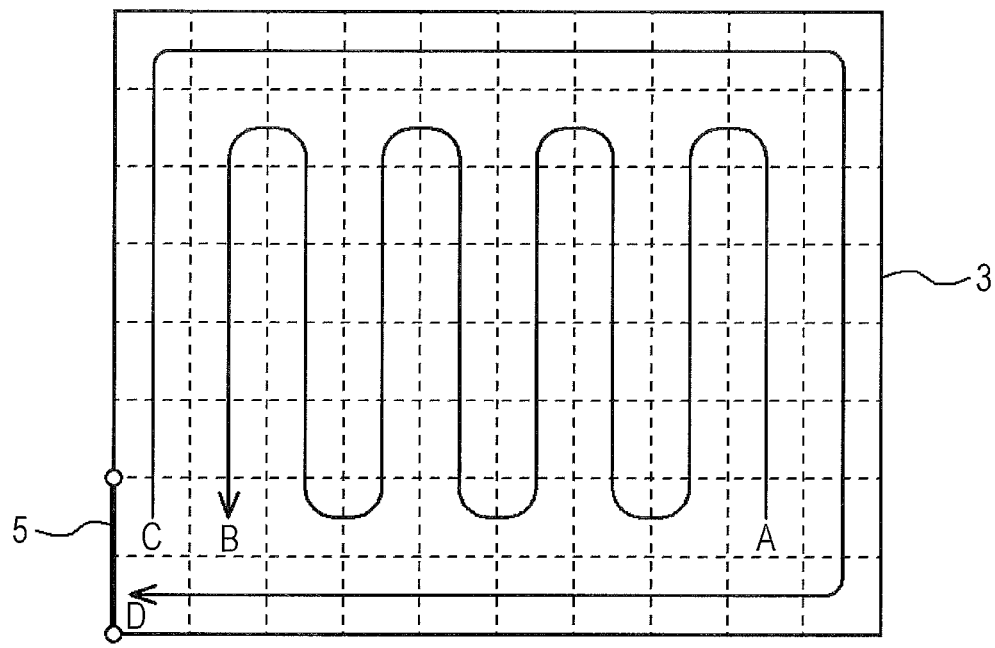
FIG. 3 is a view showing a travel route and a division map of a rice transplanter.
Figure 4:
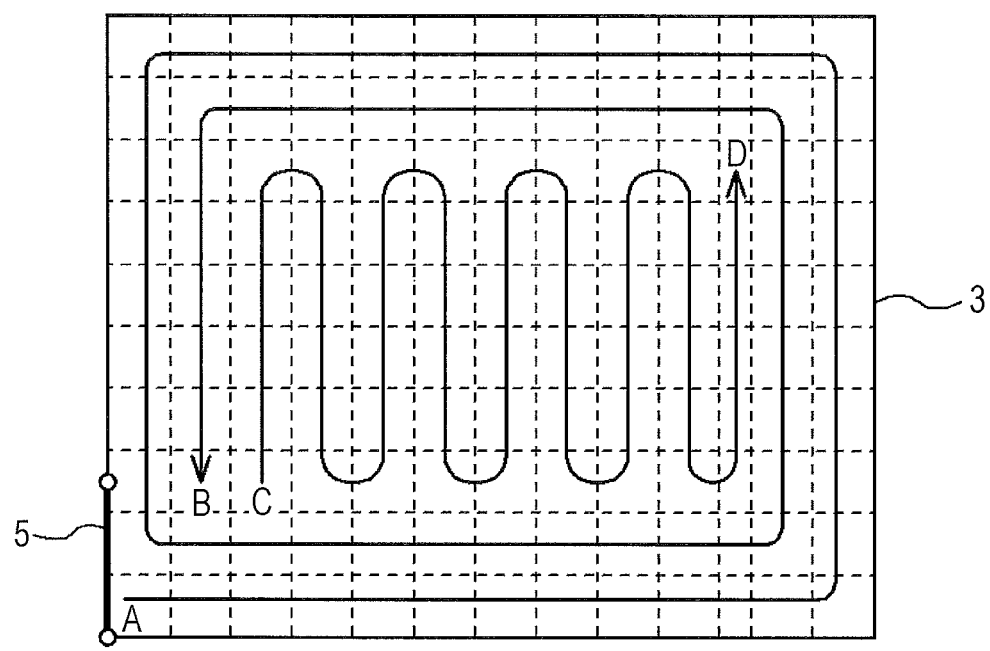
FIG. 4 is a view showing a travel route and a division map of a combine.

Here, in the present embodiment, the work vehicle 2 is a plurality of types of work vehicles. The plurality of types of work vehicles are work vehicles that are different in at least one of a width of work performed by the work vehicle (work width) and a content of the work. In the present embodiment, the plurality of types of work vehicles 2 are work vehicles that perform different work and the travel routes along which the work vehicles travel in the work field 3 are different from each other. Specifically, as a plurality of types of work vehicle 2, a tractor, a rice transplanter, and a combine will be described as examples. FIG. 2 shows an example of a travel route of a tractor, FIG. 3 shows an example of a travel route of a rice transplanter, and FIG. 4 shows an example of a travel route of a combine (an example of a harvester). When each of the work vehicles 2 is provided with work field information on the work field 3 and entrance and exit information indicating an entrance door 5 where the work vehicle 2 enters and exits in the work field 3, each of the work vehicles 2 automatically creates the travel route shown in each of FIGS. 2 to 4. In each of FIGS. 2 to 4, the travel route is indicated by a route traveled from A to B and then traveled from C to D. Since the setting for a travel route as above is known, the explanation thereof will be omitted.

Returning to FIG. 1, the division map creation unit 30 creates a division map in accordance with the work width of the work performed when the work vehicle 2 travels in the work field 3 based on the route information and the travel direction of the work vehicle 2 during traveling. In the present embodiment, the division map creation unit 30 is mounted in a server 4 provided separately from the work vehicle 2, and route information is transmitted from the route information acquisition unit 20 in the work vehicle 2. The division map is a mesh-like map obtained by dividing the work field 3 in which the work vehicle 2 travels into a plurality of sections. FIGS. 2 to 4 show a plurality of sections divided by broken lines. The examples of FIGS. 2 to 4 show that the work widths of the work of the tractor and the rice transplanter are the same, and the work width of the combine is smaller than the work widths of the tractor and the rice transplanter. For this reason, the sections shown by the broken lines are smaller in FIG. 4 than those in FIGS. 2 and 3. In addition, by way of example, although each of the sections is squared along the travel direction with the work width taken as a reference, the shape of the sections is not particularly restricted to a square. The division map creation unit 30 creates a division map divided into a plurality of sections for each area (work width) where the work vehicle 2 actually passes and works as described above. This enables creation of a division map in accordance with the work content of the work vehicle 2, thus eliminating the need for division into unnecessarily fine sections. The division map may be created such that the center of the travel route passes through the center of the section, or such that the center of the travel route is deviated from the center of the section.

The storage unit 40 stores the division map created by the division map creation unit 30 in association with the work vehicle 2. As described above, the travel route and a plurality of sections may vary depending on the work vehicle 2. Therefore, the storage unit 40 stores the division map created by the division map creation unit 30 in association with the work vehicle 2 traveling in the work field 3 along the travel route used for creating the division map. As in the present embodiment, when a plurality of types of work vehicles 2 having different work contents work in the single work field 3, the storage unit 40 stores a plurality of division maps in association with the single work field 3 for each type of the work vehicles 2.

Further, the storage unit 40 preferably stores each of a plurality of sections of the division map in association with work information related to the work performed by the work vehicle 2. Examples of the work information on the work performed by the work vehicle 2 include a vehicle speed at the time of the work vehicle 2 performing the work, a cultivation depth at the time of cultivating the work field 3, a height setting for the ground work device (impulse), a fertilizing amount, and the like. The work information indicates the taste of the crop when the work vehicle 2 is the combine. The storage unit 40 may store each of a plurality of sections in association with such information as above.

With the configuration formed in this manner, it is possible to create a division map suitable for the work performed by the work vehicle 2. Accordingly, the data managed by the division map matches the data acquired by the actual work, to allow improvement in accuracy, and the use of the division map of the own vehicle in accordance with the work of the work vehicle 2 enables the work vehicle 2 to work efficiently.

Other Embodiment

In the above embodiment, the description has been given with the example where the work field information acquisition unit 10 and the route information acquisition unit 20 are mounted on the work vehicle 2 and the division map creation unit 30 and the storage unit 40 are mounted on the server 4 different from the work vehicle 2. However, all of the work field information acquisition unit 10, the route information acquisition unit 20, the division map creation unit 30, and the storage unit 40 may be mounted on the work vehicle 2, or all the functional units may be mounted on the server 4. In addition, the CPUs 2P and 4P can be integrated into a single CPU, and the memories 2M and 4M can be integrated into a single memory.

In the above embodiment, although the work vehicle 2 has been described by taking the plurality of types of work vehicles 2 as an example, the work vehicle 2 may not be a plurality of types. Although the description has been given with the examples of the tractor, the rice transplanter, and the combine as the plurality of types of work vehicles 2, it is also possible to apply to other work vehicles 2.

In the above embodiment, the description has been given of the case where the storage unit 40 stores each of a plurality of sections of the division map in association with work information related to the work performed by the work vehicle 2. However, the storage unit 40 may store each of a plurality of sections of the division map not in association with work information related to the work performed by the work vehicle 2.

In the above embodiment, the travel route has been described as being a route along which the work vehicle 2 travels during automatic traveling. However, the travel route may be a travel route at the time of causing the work vehicle 2 to manually travel, or may be a travel route at the time of teaching the work vehicle 2 for traveling by remote control.

In the above embodiment, the description has been given assuming that the division map is created by dividing the work field into a plurality of sections based on the work width of the work vehicle 2. However, when the work width is changed in the middle of the work (e.g., at the time of planting on each row by the rice transplanter, at the time of one-side folding by a tractor harrow, etc.), the work field may be divided into a plurality of sections with the changed work width.

INDUSTRIAL APPLICABILITY

The embodiment of the present invention is applicable to a division map creation system that creates a division map obtained by dividing a work field in which a work vehicle travels into a plurality of sections.

A characteristic configuration of a division map creation system according to the present invention is a division map creation system to create a division map obtained by dividing a work field in which work vehicles are configured to travel into a plurality of sections, the system including: a work field information acquisition unit to acquire work field information including position information indicating a position of the work field and shape information indicating a shape of the work field; a route information acquisition unit to acquire route information indicating individual travel routes when the work vehicles travel in the work field based on the work field information; a division map creation unit to create the division maps in accordance with work widths of works performed when the work vehicles travel in the work field based on the route information and travel directions of the work vehicles during traveling; and a storage unit to store the division maps created by the division map creation unit in association with the work vehicles.

With such a characteristic configuration, a division map is created by dividing a work field into a plurality of sections in accordance with a work width and a travel direction of a work vehicle, thereby enabling creation of a work map suitable for the work of the work vehicle. Hence it is possible to effectively use the work map in accordance with the work of the work vehicle.

For example, when the work vehicles are a plurality of types of work vehicles, the storage unit is preferably configured to store a plurality of division maps in association with the types of the work vehicles. The plurality of the division maps belong to an identical work field.

With such a configuration, a division map is created in accordance with the work width and along the travel direction of each of a plurality of types of work vehicles, thereby enabling creation of a work map in accordance with each of the work vehicles even when work widths of the work vehicles are different from each other. Hence it is possible to effectively use the work map in accordance with the work of each of the work vehicles.

Further, for example, when the plurality of types of work vehicles are work vehicles to perform different works, the travel routes along which the work vehicles are configured to travel in the work field are different from each other.

With such a configuration, a division map is created in accordance with the work width and along the travel direction of each of a plurality of types of work vehicles, thereby enabling creation of a work map in accordance with each of the work vehicles even when travel routes of the work vehicles are different from each other. Hence it is possible to effectively use the work maps even when the work vehicles travel based on travel routes in accordance with works of the work vehicles.

Moreover, the storage unit is preferably configured to store each of a plurality of sections of the division maps in association with work information related to works performed by the work vehicle.

With this configuration, the work vehicle performs work with reference to the work map at the time of performing work, and can thus perform work suitable for the work field.

Obviously, numerous modifications and variations of the present invention are possible in light of the above teachings. It is therefore to be understood that within the scope of the appended claims, the invention may be practiced otherwise than as specifically described herein.

What is claimed is:

1. A division map creation system comprising:
circuitry configured to acquire work field information including a shape of a work field and a position of the work field,
acquire a first travel route based on the work field information, a first work vehicle being configured to travel along the first travel route in the work field and to work within a first work width while travelling in the work field,
acquire a second travel route based on the work field information, a second work vehicle being configured to travel along the second travel route in the work field and to work within a second work width while travelling in the work field, the second work width being different from the first work width, and
divide, based on a first travel direction in which the first work vehicle travels along the first travel route, the work field into a plurality of first sections each of which has the first work width in order to create a first division map,
divide, based on a second travel direction in which the second work vehicle travels along the second travel route, the work field into a plurality of second sections each of which has the second work width in order to create a second division map, and
a memory to store the first division map and the second division map such that the first division map and the second division map belong to the work field.

2. The division map creation system according to claim 1, wherein a type of the first work vehicle is different from a type of the second work vehicle, and
wherein the first division map and the second division map correspond to the first work vehicle and the second work vehicle, respectively.

3. The division map creation system according to claim 2, wherein the first work vehicle and the second work vehicle are configured to perform different works, and
wherein the first travel route and the second travel route are different from each other.

4. The division map creation system according to claim 1, wherein the memory is configured to store the plurality of the first sections of the first division map in association with work information related to a first work performed by the first work vehicle, and
wherein the memory is configured to store the plurality of the second sections of the second division map in association with work information related to a second work performed by the second work vehicle.

5. The division map creation system according to claim 1, the circuitry comprising:
first circuitry configured to acquire the work field information, the first travel route, and the second travel route; and
second circuitry configured to divide the work field into the plurality of the first sections to create the first division map and to divide the work field into the plurality of the second sections to create the second division map.

6. The division map creation system according to claim 1, wherein the first work vehicle is a harvester.

7. A division map creation system comprising:
work field information acquisition means for acquiring work field information including a shape of a work field and a position of the work field;
first travel route acquisition means for acquiring a first travel route based on the work field information, a first work vehicle being configured to travel along a first travel route in the work field and to work within a first work width while travelling in the work field and to work within a first work width while travelling in the work field;
second travel route acquisition means for acquiring a second travel route based on the work field information, a second work vehicle being configured to travel along the second travel route in the work field and to work within a second work width while travelling in the work field, the second work width being different from the first work width;
first division map creating means for dividing based on a first travel direction in which the first work vehicle travels along the first travel route, the work field into a plurality of first sections each of which has the first work width in order to create a first division map;
second division map creating means for dividing, based on a second travel direction in which the second work vehicle travels along the second travel route, the work field into a plurality of second sections each of which has the second work width in order to create a second division map; and
division map storing means for storing the first division map and the second division map such that the first division map and the second division map belong to the work field.

8. The division map creation system according to claim 7, wherein the first work vehicle is a harvester.

9. A method for creating division maps, comprising:
acquiring work field information including a shape of a work field and a position of the work field;
acquiring a first travel route based on the work field information, a first work vehicle being configured to travel along the first travel route in the work field and to work within a first work width while travelling in the work field;
acquiring a second travel route based on the work field information, a second work vehicle being configured to travel along the second travel route in the work field and to work within a second work width while travelling in the work field, the second work width being different from the first work width;
dividing, based on a first travel direction in which the first work vehicle travels along the first travel route, the work field into a plurality of first sections each of which has the first work width in order to create a first division map;
dividing, based on a second travel direction in which the second work vehicle travels along the second travel route, the work field into a plurality of second sections each of which has the second work width in order to create a second division map; and
storing the first division map and the second division map such that the first division map and the second division map belong to the work field.

10. The division map creation system according to claim 9, wherein the first work vehicle is a harvester.

* * * * *